United States Patent [19]

Brasseux

[11] 4,251,217

[45] Feb. 17, 1981

[54] OIL WELL PRODUCTION TRAINING DEVICE

[76] Inventor: Robert W. Brasseux, Rte. B, Box 3905, New Iberia, La. 70560

[21] Appl. No.: 52,072

[22] Filed: Jun. 25, 1979

[51] Int. Cl.³ .............................................. G09B 25/02
[52] U.S. Cl. .................................................... 434/219
[58] Field of Search ................... 35/10, 13, 49, 50, 51, 35/52, 53; 46/39

[56] References Cited

U.S. PATENT DOCUMENTS

| | | | |
|---|---|---|---|
| 1,954,561 | 4/1934 | Cygon | 35/51 |
| 3,363,340 | 1/1968 | McKinley | 35/10 X |

Primary Examiner—William H. Grieb
Attorney, Agent, or Firm—Guy E. Matthews

[57] ABSTRACT

A training device to aid in instructing and testing personnel in the operation of offshore oil production equipment and federal safety regulations and equipment. The device is adapted to simulate various oil field production conditions such as varying downhole pressures, pipeline pressures, various fluid levels, etc., in addition to simulating common oil field production problems, such as blowouts, pipeline ruptures, fires, valve failures, etc. The device is portable, and is designed for use on land in order to train oil field personnel in the use of offshore production facilities prior to their operating an actual offshore production facility.

33 Claims, 1 Drawing Figure

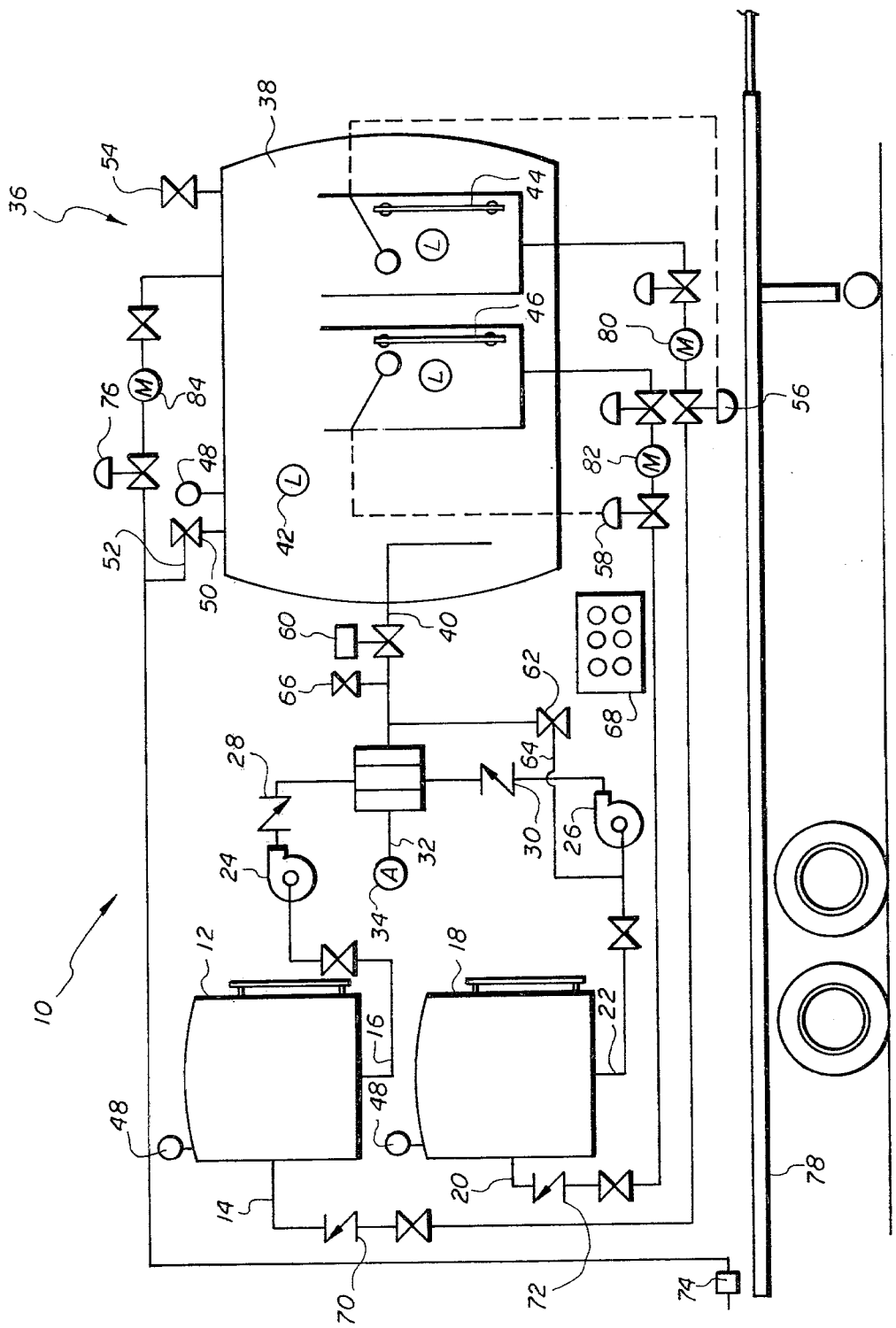

OIL WELL PRODUCTION TRAINING DEVICE

BACKGROUND OF THE INVENTION

A shift of this Nation toward increased consumption of oil and petroleum products and the likelihood of impending shortages in crude oil imported into this Nation have spawned a concentrated effort to search for oil offshore in places like the Gulf Coast and along the North Sea shore in an effort to locate additional oil reserves. This sudden increase in demand for both manpower and equipment has necessitated the formation of a means and method of training inexperienced oilfield and offshore personnel in safety measures and in the use of anti-pollution safety devices required by the Environmental Protection Agency, the United States Coast Guard and other federal regulatory agencies for use on offshore drilling equipment.

Heretofore, no such device has ever been used on land in a training capacity to instruct offshore personnel in the use of anti-pollution safety devices and other regulatory practices required by various governmental oil production safety and anti-pollution concerns.

It is therefore an object of the present invention to provide a device by which oilfield and offshore personnel may be instructed in the use of anti-pollution safety devices as required by various regulatory agencies of the Federal Government and otherwise trained in the use of offshore oilwell drilling and oil and gas production equipment.

SUMMARY OF THE INVENTION

In accordance with the invention, a device is disclosed to aid in instructing and testing offshore personnel in the operation of offshore oil production equipment and federal safety regulations and equipment. The device comprises a storage vessel and pump for simulating an oil formation and bottomhole pressure, a christmas tree surface safety valve, a fluid sampling device, a means for simulating pressurized gas in the wellbore, a vessel for separating fluids from the simulated reservoir, including various temperature, pressure and fluid level monitoring devices, and a control panel for monitoring these various pressures, temperatures, and fluid levels within the system. By manually adjusting the valves within the system to control the various pressures and fluid levels, authentic production conditions, such as downhole pressures, blowouts, pipeline ruptures, fires, etc. may be simulated.

BRIEF DESCRIPTION OF THE DRAWING

Other objects and advantages of the invention will become apparent upon a reading of the following detailed description and upon reference to the drawing, which is a schematic diagram of the preferred embodiment of the present invention.

While the invention will be described in connection with a preferred embodiment and procedure, it will be understood that it is not intended to limit the invention to that embodiment and procedure. On the contrary, it is intended to cover all alternatives, modifications and equivalents that may be included within the spirit and scope of the invention as defined by the appended claims.

DETAILED DESCRIPTION OF THE INVENTION

Turning now to the drawing, a schematic diagram of the self-contained pneumatic production training device is shown generally illustrated by the numeral 10. The training device 10 includes a first storage vessel 12 for storing a first liquid, such as salt water. The vessel 12 includes an inlet 14 by which salt water is introduced into the vessel for recirculation within the system, and an outlet 16 located near a bottom portion thereof through which the salt water exits on its way through the circulatory system of the device 10. The device 10 also includes a second storage vessel 18 for storing a second liquid, such as oil, diesel or the like, for circulation to the remaining part of the system. The second vessel 18 likewise includes an inlet 20 and an outlet 22 at the lower portion thereof similar to that of the first vessel 12.

A first fluid pump 24 is connected to the outlet 16 of the first storage vessel 12 to pressurize the fluid therein (salt water) and pump it through the system of valves comprising the training device 10. Likewise, a second pump 26 is connected to the outlet 22 of the second storage vessel 18 in order to pressurize the second liquid (oil or diesel) and pump it throughout the system. A first check valve 28 is connected to the high pressure side of the first pump 24 for preventing the fluid therein from reversing direction due to possible pressure surges downstream of the pump within the separation section of the system. Likewise, a second check valve 30 is connected to the high pressure side of the second pump 26 to prevent pressure surges downstream from reversing the direction of fluid flow and otherwise damaging the pump or storage vessel 18.

Each of the fluids from the first storage vessel 12 and second storage vessel 18 enters a fluid sampling device 32 which mixes the two fluids for introduction into the separation section of the training device 10. At this point, compressed gas is injected into the fluid sampling device 32 by an appropriate means 34 to aid in mixing the two fluids. Following introduction of the compressed gas, the fluid sampling device 32 automatically extracts a sample of fluid therefrom for purposes of determining the percentage content of the first fluid (salt water), the second fluid (oil or diesel) and compressed gas.

The pressurized combination of first fluid, second fluid and gas then enters a separator vessel 36, which will be discussed in greater detail hereinbelow. The pressurized combination exiting the fluid sampling device 32 passes through a first pressure regulating valve 62, such valve for regulating the pressure on the separator vessel 36 and for relieving any excess pressure. The first pressure regulating valve 62 includes an exhaust port 64 through which any excess fluid pressure is relieved and returned to the low pressure side of the second fluid pump 26 for recirculation within the system without overpressurizing or otherwise damaging the separator vessel 36.

The separator vessel 36 comprises a main body portion 38 which houses various pressure, temperature and fluid level sensing devices to be described hereinbelow. The mixture of pressurized fluids and gas enters the separator vessel 36 at an inlet 40, whereupon the two fluids are separated from each other for return to the first and second storage vessels 12 and 18, respectively. A main closure valve 60 is mounted at the separator vessel inlet 40 for closing off fluid flow into the separator vessel 36, when required. The separator vessel 36 includes a means 42 for indicating a high fluid level therein, which means is connected to the closure valve 60 to close fluid flow into the separator vessel in the event the fluid level therein reaches a predetermined maximum. Included within the separator vessel 36 are first and second means 44 and 46 for indicating levels of the first and second fluids in their respective separation compartments within the vessel. These fluid level indicating means 44 and 46 are also connected with the closure valve 60 to close the inlet 40 to the separator vessel in the event either fluid reaches a predetermined minimum or maximum level within its respective component part of the separator vessel.

The separator vessel 36 also includes a temperature sensitive safety device 48 for monitoring the temperature of the vessel and the fluid therein, which safety device is also connected to the closure valve 60 and operates to close the valve upon the occurence of an abnormal temperature therein.

Pressure within the separator vessel 36 is monitored and regulated by a first pressure relief valve 50 having a relief port 52 which relieves any excess pressure within the separator vessel to atmosphere. The vessel 36 also includes a second pressure regulating valve 54 for monitoring and regulating pressure within various fluid lines interconnecting the separator vessel and various valves comprising the training device 10.

The separator vessel 36 includes first and second drain valves 56 and 58 for draining the separated fluids from the vessel and returning them to their respective storage vessels 12 and 18, completing the fluid path within the training device 10.

First and second fluid meters 80 and 82 are mounted with respective first and second drain valves 56 and 58, and upstream thereof, for measuring the amounts of first and second fluids discharged from the separator vessel 36 as the fluids make their way back to the storage vessels 12 and 18.

A third pressure regulating valve 66 is connected to the separator vessel inlet 40 immediately upstream of the closure valve 60 and immediately downstream of the first pressure relief valve 62. This third regulating valve 66 monitors and regulates the flow of fluid from the fluid sampling device 32 through the closure valve 60 and into the separator vessel 36.

The preferred embodiment of the present invention also includes third and fourth check valves 70 and 72 connecting the outlets of the first and second drain valves 56 and 58 to the respective inlets 14 and 20 of the first and second storage vessels 12 and 18. These check valves 70 and 72 preclude fluid from flowing backward from the storage vessel 12 and 18 into the separator vessel 36. The preferred embodiment also includes a second pressure relief valve 76 mounted at an upper portion of the separator vessel 36 for relieving excess gas pressure through a flame arrestor 74 to atmosphere. Also included is a gas meter 84 mounted with the first pressure relief valve 76 for measuring the amount of gas discharged from the separator vessel 36.

The preferred embodiment of the present invention is mounted on a mobile cart 78, which cart includes a monitoring and control panel 68 for monitoring and controlling each of the valves, pressures and temperatures enumerated herein.

In operation, the self-contained pneumatic production training device 10 is used to simulate oilwell production in order to train offshore personnel regarding offshore production operations and safety standards as required by various federal regulatory agencies. In the preferred embodiment, the first storage vessel 12, simulates a salt water reservoir or other producing formation beneath the earth's surface, and the second storage vessel 18 simulates an oil producing reservoir or formation. Each of the fluids in the tanks is pressurized by respective fluid pumps 24 and 26 to simulate bottomhole pressure at the wellhead. The first and second check valves 28 and 30 are federal requirements to minimize backflow from the simulated reservoir or formation (storage vessels 12 and 18). At this point, fluids from respective storage vessels 12 and 18, after passing through the check valves, are collected in the fluid sampling device 32, into which compressed gas is injected to simulate gas in the wellbore. Fluid sampling device 32 automatically extracts a sample of the oil-gas-water mixture for purposes of determing the percentage content of each.

The closure valve 60 simulates a surface safety valve located on a christmas tree of a well, also a federal requirement, to shut-off the well in case of any abnormal condition such as a ruptured pipeline, fire, defective valve, etc. The first pressure regulating valve 62 is connected to the flow line immediately upstream of the closure valve 60, which regulating valve prevents overpressurization of the flow line from the fluid pumps 24 and 26 to the closure valve and relieves any excess pressure therein to the downstream or low pressure side of the second fluid pump 26, to recirculate any excess fluid within the system. Pressure on this simulated christmas tree is monitored by the third pressure regulating valve 66 mounted immediately upstream of the closure valve 60. Any abnormal pressure developing herein will cause the closure valve 60 to close, shutting down the system entirely and so indicating, both the cause and effect, on the monitoring and control panel 68.

The first pressure relief valve 50 simulates a pressure safety high-low (PSHL) valve on a production vessel by monitoring the pressure within the separator vessel 36. Similarly, the second pressure regulating valve 54 simulates a PSHL on a production flow line to monitor the pressure therein. High pressures can be simulated on the production vessel (separator vessel) or production flow line by closing the second pressure relief valve 76 mounted on the upper portion of the separator vessel 36 and excessive pressure on either pressure regulating valve 50 or 54 will cause the closure valve 60 to shutoff flow from the simulated well formation (storage vessels and pumps), and so indicate on the monitoring and control panel 68.

The second pressure relief valve 66 is vented to atmosphere through a flame arrestor 74 to simulate natural gas from the wellhead being vented.

The training device 10 includes a number of temperature sensitive devices 48 positioned at strategic points within the system to monitor fluid temperatures therein. Each of these devices 48 comprises a fusible plug which can be loosened to simulate a fire within the system. In such an instance, the closure valve 60 will shutoff fluid flow to the separator vessel 36 and so indicate the cause on the monitoring and control panel 68. In addition, each of the pressure sensitive devices and liquid level sensing devices within the system is connected to the closure valve 60 so that, upon the occurence of any abnormal condition (excessive pressure, temperature, high or low fluid level), the closure valve will stop fluid flow to the separator vessel 36 and so indicate the reason on the control panel 68.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An oil well production training system for simulating various well and pipeline conditions relative to oil well production comprising:
   (a) means for simulating oil, gas, and other fluids;
   (b) means for simulating downhole, surface and/or pipeline pressures;
   (c) means for simulating changes in pressures; and
   (d) means for monitoring and regulating said pressures wherein individuals being trained on said system learn the causes of pressure drops in downhole and/or surface and/or pipeline pressures and how to correct and/or shut down such systems, thereby simulating the correction and/or shut down of a producing well or wells.

2. A self contained oil well production training device for simulating various well and pipeline conditions relative to oil well production for training oil field personnel in the handling of drilling, production, safety and other operations, comprising:
   (a) pump means for pumping a fluid;
   (b) separator means for receiving fluid from said fluid pump means for separating the fluid from other fluids, gases and solids including therewith;
   (c) closure valve means mounted with said separator means for simulating a surface safety valve or shut down valve on a pipeline; and
   (d) control means for monitoring and controlling said valve means wherein closing of said closure valve means simulates well conditions which normally closes such surface safety valve to enable training of oil field personnel.

3. The device as set forth in claim 2, including valve means mounted with the output of said fluid pump means for precluding the flow of fluid in a reverse direction.

4. The device as set forth in claim 2, including means for injecting compressed gas mounted with said separator means.

5. The device as set forth in claim 2, including a plurality of temperature sensitive safety device means for indicating abnormal temperatures within said oil well production training device.

6. The device as set forth in claim 2, including second valve means mounted with said fluid pump means for regulating fluid pressure at said closure valve means.

7. The device as set forth in claim 2, including a flame arrestor mounted with said separator means for preventing flame from backing up into said separator means.

8. The device as set forth in claim 4, including a plurality of temperature sensitive safety device means for indicating abnormal temperatures within said oil well production training device.

9. The device as set forth in claim 8, wherein:
   (a) said fluid pump means simulates well bottomhole pressure;
   (b) said compressed gas injecting means simulates natural gas in the wellbore;
   (c) said closure valve means simulates a surface safety valve on a wellhead christmas tree or production pipeline; and
   (d) said temperature sensitive safety device means simulate fires within the wellhead equipment, wellbore or flow lines.

10. A self-contained oil well production training device for simulating various well and pipeline conditions relative to oil well production for training oil field personnel in the handling of well and drilling operations, comprising:
    (a) closure valve means for simulating a surface controlled subsurface safety valve;
    (b) a wellhead christmas tree;
    (c) valve means mounted with said wellhead christmas tree for automatically relieving and collecting a sample of fluid entering said christmas tree;
    (d) separator means for separating fluid from other fluids, gases and solid material included therewith;
    (e) means mounted with said wellhead christmas tree for injecting compressed gas thereinto;
    (f) holding means for receiving fluid from said separator means and for holding said fluid for recirculation within said oil well production training device;
    (g) fluid pump means mounted with said holding means for pressurizing fluid therein for returning the fluid to said oilwell production training device; and
    (h) control means for monitoring and controlling each of said valve means.

11. The device as set forth in claim 10, wherein said separating means comprises an enclosed vessel having:
    (a) a body portion;
    (b) inlet means;
    (c) means for indicating a high fluid level therein;
    (d) means for indicating a low fluid level therein;
    (e) valve means for monitoring and regulating pressure within said vessel; and
    (f) valve means for draining the fluid from said separator means.

12. The device as set forth in claim 10, wherein said training device is mobile for transporting from one location to another.

13. The device as set forth in claim 10, including a flame arrestor connected to an outlet of said holding vessel for preventing flame from backing up into said vessel.

14. The device as set forth in claim 10, wherein
    (a) said pump means simulates well bottomhole pressure;
    (b) said compressed gas injecting means simulates natural gas in the wellbore; and
    (c) said temperature sensitive safety device means simulate fires within the wellhead equipment, wellbore or flow lines.

15. The device as set forth in claim 14, wherein said training device is mobile for transporting from one location to another.

16. A self-contained oil well production training device for simulating various well and pipeline conditions relative to oil well production for training oil field personnel in the handling of well and drilling operations, comprising:
- (a) storage means for storing a fluid;
- (b) fluid pump means mounted with said storage means for pumping fluid therefrom;
- (c) valve means mounted with said pump means for precluding flow of fluid in a reverse direction;
- (d) fluid sampling means mounted with said valve means for automatically collecting a sample of fluid entering said fluid sampling means;
- (e) means for injecting compressed gas into said fluid sampling means;
- (f) separator means for separating the fluid from other fluids, gases and solid material included therewith;
- (g) closure valve means mounted with said separator means for blocking the supply of fluid into said separator means;
- (h) first pressure regulating valve means mounted with said fluid sampling means for regulating pressure entering said closure valve means;
- (i) second pressure regulating valve means mounted with said closure valve means for monitoring and regulating flow of fluid into said closure valve means;
- (j) first pressure relief valve means mounted with said separator means for monitoring and regulating pressure within said separator means and for bleeding such excess pressure to atmosphere;
- (k) a plurality of temperature sensitive safety device means for monitoring and regulating abnormal temperatures within said oil field production training device; and
- (l) control means for monitoring and controlling each of said valve means and temperature sensitive means.

17. The device as set forth in claim 16, wherein said separator means comprises an enclosed vessel having:
- (a) a main body portion;
- (b) an inlet means;
- (c) means for indicating a high fluid level therein;
- (d) means for indicating a low fluid level therein;
- (e) temperature sensitive safety device means for indicating an abnormal temperature therein;
- (f) second pressure regulating valve means for monitoring and regulating pressure within fluid lines interconnecting said production training device; and
- (g) drain valve means for draining fluid from said vessel.

18. The device as set forth in claim 16, including second check valve means mounted with said drain valve means.

19. The device as set forth in claim 16, wherein said training device is mobile for transporting from one location to another.

20. The device as set forth in claim 16, including flame arrestor means mounted with said second pressure relief valve means for preventing flame from backing up into said valve means and said separator means.

21. The device as set forth in claim 17, including a fluid meter mounted with said drain valve means for measuring the amount of fluid discharged from said vessel, and including a gas meter mounted with said first pressure relief valve means for measuring the amount of gas discharged from said vessel.

22. The device as set forth in claim 17, wherein:
- (a) said storage vessel simulates a producing reservoir or formation;
- (b) said fluid pump means simulates well bottomhole pressure;
- (c) said compressed gas injecting means simulates natural gas in the wellbore;
- (d) said closure valve means simulates a surface safety valve in a wellhead christmas tree or a production pipeline;
- (e) said first pressure regulating valve means simulates oil well production;
- (f) said second pressure relief valve means simulates production flow line pressure;
- (g) said temperature sensitive safety device means simulate fires within the wellhead equipment, wellbore or flow line;
- (h) said drain valve means is used to simulate ruptures in production flow lines and to simulate malfunctions in said separator vessel; and
- (i) said second pressure regulating valve means is used to simulate the extreme pressures in production flow lines.

23. A self contained oil well production training device for simulating various well and pipeline conditions relative to oil well production for training oil field personnel in the handling of well and drilling operations, comprising:
- (a) first storage means for storing a first fluid;
- (b) second storage means for storing a second fluid;
- (c) first fluid pump means mounted with said first storage means for pumping the first fluid therefrom;
- (d) second pump means mounted with said second storage means for pumping the second fluid therefrom;
- (e) first check valve means mounted with said first fluid pump for precluding flow of the first fluid in a reverse direction;
- (f) second check valve means mounted with said second fluid pump for precluding flow of second fluid in a reverse direction;
- (g) fluid sampling means mounted with said first and second check valve means for automatically collecting a sample of fluid entering said fluid sampling means;
- (h) means for injecting compressed gas into said fluid sampling means;
- (i) separator means for separating the various fluids and gases including therein;
- (j) closure valve means mounted with said separator means for precluding the flow of fluid into said separator means;
- (k) first pressure regulating valve means mounted with said fluid sampling means for regulating pressure therein;
- (l) second pressure regulating valve means mounted with said closure valve means for monitoring and regulating flow of fluid into said closure valve means;
- (m) first pressure relief valve means for monitoring and regulating pressure within said separator means;
- (n) a plurality of temperature sensitive safety device means for indicating abnormal temperatures within said oil well production training device; and
- (o) control means for monitoring and controlling each of said valve means and temperatures.

24. The device as set forth in claim 23, wherein said second pressure regulating valve means in adapted to bleed excess pressure to atmosphere.

25. The device as set forth in claim 23, wherein said first pressure regulating valve means includes an exhaust port mounted with said second fluid pump means for returning such excess fluid relieved by said regulating means to said second fluid pump means.

26. The device as set forth in claim 23, wherein said separator means comprises a separator vessel having:
 (a) a main body portion;
 (b) an inlet means;
 (c) means for indicating a high fluid level therein;
 (d) means for indicating a low first fluid level therein;
 (e) means for indicating a low second fluid level therein;
 (f) temperature sensitive safety device means for indicating abnormal temperatures therein;
 (g) third pressure regulating valve means for monitoring and regulating pressure within fluid lines interconnecting said training device;
 (h) first drain valve means for draining the first fluid from said separator vessel; and
 (i) second drain valve means for draining the second fluid from said separator vessel.

27. The device as set forth in claim 26, wherein said fourth pressure regulating valve includes means for relieving such excess pressure to atmosphere.

28. The device as set forth in claim 26, wherein said first pressure regulating valve means includes an exhaust port mounted with said second fluid pump means for returning such excess fluid relieved by said regulating means to said second fluid pump means.

29. The device as set forth in claim 26, including third and fourth check valve means mounted with respective first and second drain valve means.

30. The device as set forth in claim 23, wherein said training device is mobile for transporting from one location to another.

31. The device as set forth in claim 23, including flame arrestor means mounted with said second pressure relief valve means for preventing flame from backing up into said valve means and said separator means.

32. The device as set forth in claim 26, including a first fluid meter mounted with said first drain valve means for measuring the amount of first fluid discharged from said vessel, and including a second fluid meter mounted with said second drain valve means for measuring the amount of second fluid discharged from said vessel, and including a gas meter mounted with said first pressure relief valve means for measuring the amount of gas discharged from said vessel.

33. The device as set forth in claim 26, wherein:
 (a) said first and second storage means simulate producing reservoirs or formations;
 (b) said first and second fluid pump means simulate well bottomhole pressure;
 (c) said compressed gas injecting means simulates natural gas in a wellbore;
 (d) said closure valve means simulates a surface safety valve on a wellhead christmas tree or production pipeline;
 (e) said third pressure regulating valve means simulates production flow line pressures;
 (f) said second pressure regulating valve means simulates oil well production;
 (g) said temperature sensitive safety device means simulate fires within the wellhead equipment, wellbore or flow lines; and
 (h) said first and second drain valve means are used to simulate ruptures in a production flow line and to simulate malfunctions in said separator means.

* * * * *